(12) United States Patent
Steele, Jr.

(10) Patent No.: US 7,133,890 B2
(45) Date of Patent: *Nov. 7, 2006

(54) TOTAL ORDER COMPARATOR UNIT FOR COMPARING VALUES OF TWO FLOATING POINT OPERANDS

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 568 days.

This patent is subject to a terminal disclaimer.

(21) Appl. No.: 10/028,375

(22) Filed: Dec. 28, 2001

(65) Prior Publication Data

US 2003/0126173 A1   Jul. 3, 2003

Related U.S. Application Data

(60) Provisional application No. 60/293,173, filed on May 25, 2001.

(51) Int. Cl.
G06F 7/38 (2006.01)

(52) U.S. Cl. .................................... 708/495

(58) Field of Classification Search ............... 708/495; 340/146.2
See application file for complete search history.

(56) References Cited

U.S. PATENT DOCUMENTS

| | | | |
|---|---|---|---|
| 3,725,649 A | 4/1973 | Deerfield | |
| 4,777,613 A | 10/1988 | Shahan et al. | |
| 4,788,655 A | 11/1988 | Nakayama et al. | |
| 4,991,131 A | 2/1991 | Yeh et al. | |
| 5,065,352 A | 11/1991 | Nakano | |
| 5,126,963 A | 6/1992 | Fukasawa | |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams | 364/748 |
| 5,347,482 A | 9/1994 | Williams | 364/757 |
| 5,357,237 A | 10/1994 | Bearden et al. | |
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |

(Continued)

OTHER PUBLICATIONS

U.S. Appl. No. 10/320,547, filed Dec. 17, 2002, Steele, Jr.

(Continued)

*Primary Examiner*—Tan V. Mai
(74) *Attorney, Agent, or Firm*—Finnegan, Henderson, Farabow, Garrett & Dunner, L.L.P.

(57) ABSTRACT

A floating point total order comparator circuit for comparing a first floating point operand and a second floating point operand includes a first analysis circuit for determining a format of the first floating point operand based upon floating point status information encoded within the first floating point operand, a second analysis circuit for determining a format of the second floating point operand based upon floating point status information encoded within the second floating point operand, and a result generator circuit coupled to the analysis circuits for producing a result indicating a total order comparative relationship between the first floating point operand and the second floating point operand based on the format of the first floating point operand and the format of the second floating point operand. The result can condition the outcome of a floating point instruction. The floating point total order comparator circuit may recognize several predetermined operand formats, such as not-a-number (NaN), infinity, normalized, denormalized, invalid operation, overflow, underflow, division by zero, positive zero, negative zero, exact, and inexact.

27 Claims, 4 Drawing Sheets

U.S. PATENT DOCUMENTS

| | | | |
|---|---|---|---|
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |
| 5,931,943 A * | 8/1999 | Orup | 712/222 |
| 5,953,241 A | 9/1999 | Hansen et al. | |
| 5,963,461 A | 10/1999 | Gorshtein et al. | |
| 5,978,901 A | 11/1999 | Luedtke et al. | |
| 5,995,991 A | 11/1999 | Huang et al. | |
| 6,009,511 A | 12/1999 | Lynch et al. | 712/222 |
| 6,049,865 A | 4/2000 | Smith | |
| 6,081,823 A | 6/2000 | Purcell et al. | |
| 6,105,047 A | 8/2000 | Sharangpani et al. | |
| 6,108,772 A | 8/2000 | Sharangpani | |
| 6,131,106 A | 10/2000 | Steele, Jr. | 708/510 |
| 6,138,135 A | 10/2000 | Karp | |
| 6,151,669 A | 11/2000 | Huck et al. | |
| 6,189,094 B1 | 2/2001 | Hinds et al. | |
| 6,205,460 B1 | 3/2001 | Steele, Jr. | |
| 6,219,685 B1 | 4/2001 | Story | |
| 6,256,655 B1 | 7/2001 | Ezer et al. | |
| 6,286,023 B1 | 9/2001 | Purcell et al. | |
| 6,286,024 B1 | 9/2001 | Yano et al. | |
| 6,360,189 B1 | 3/2002 | Hinds et al. | |
| 6,393,555 B1 * | 5/2002 | Meier et al. | 712/222 |
| 6,490,607 B1 | 12/2002 | Oberman | |
| 6,571,265 B1 | 5/2003 | Story | |
| 6,594,681 B1 | 7/2003 | Prabhu | |
| 6,629,120 B1 | 9/2003 | Walster et al. | |
| 6,658,443 B1 | 12/2003 | Walster | |
| 6,658,444 B1 | 12/2003 | Walster et al. | |
| 6,697,832 B1 | 2/2004 | Kelley et al. | |
| 6,732,134 B1 | 5/2004 | Rosenberg et al. | |
| 6,789,098 B1 * | 9/2004 | Dijkstra | 708/495 |
| 2002/0194232 A1 | 12/2002 | Walster | |
| 2003/0033335 A1 | 2/2003 | Walster | |

OTHER PUBLICATIONS

U.S. Appl. No. 10/320,450, filed Dec. 17, 2002, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chiriaev & G. William Walster, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

* cited by examiner

| Value | s | e... | f... |
|---|---|---|---|
| +∞ | 0 | 1 1 1 ... | 0 0 0 ... |
| -∞ | 1 | 1 1 1 ... | 0 0 0 ... |
| NaN | X | 1 1 1 ... | Not (0 0 0 ...) |
| +0 | 0 | 0 0 0 ... | 0 0 0 ... |
| -0 | 1 | 0 0 0 ... | 0 0 0 ... |
| $(-1)^s 2^{e\text{-bias}}(1.|f...)$ | X | Not (0 0 0 ...) and Not (1 1 1 ...) | X |
| $(-1)^s 2^{e\text{-bias}+1}(0.|f...)$ | X | 0 0 0 ... | Not (0 0 0 ...) |

410, 420, 430, 440, 450, 460, 470

X = Don't Care

FIG. 4 (Prior Art)

TOTAL ORDER COMPARATOR UNIT FOR COMPARING VALUES OF TWO FLOATING POINT OPERANDS

Applicant claims the right of priority based on U.S. Provisional Patent Application No. 60/293,173 filed May 25, 2001 in the name of Guy L. Steele.

INCORPORATION BY REFERENCE

Related U.S. patent application Ser. No. 10/035,747, filed on even date herewith in the name of Guy L. Steele Jr. and entitled "Floating Point System That Represents Status Flag Information Floating Point Operand," assigned to the assignee of the present application, is hereby incorporated by reference.

Related U.S. patent application Ser. No. 10/035,586, filed on even date herewith in the name of Guy L. Steele Jr. and entitled "Comparator Unit For Comparing Values Of Floating point Operands," assigned to the assignee of the present publication, is hereby incorporated by reference.

FIELD OF THE INVENTION

The invention relates generally to systems and methods for performing floating point operations, and more particularly to systems and methods for comparing a pair of floating point operands and generating a result that reflects a total ordering of the values of the operands.

BACKGROUND OF THE INVENTION

Digital electronic devices, such as digital computers, calculators, and other devices, perform arithmetic calculations on values in integer, or "fixed point," format, in fractional, or "floating point" format, or both. IEEE Standard 754, (hereinafter "IEEE Std. 754" or "the Standard") published in 1985 by the Institute of Electrical and Electronic Engineers, and adopted by the American National Standards Institute (ANSI), defines several standard formats for expressing values in floating point format, and a number of aspects regarding behavior of computation in connection therewith. In accordance with IEEE Std. 754, a representation in floating point format comprises a plurality of binary digits, or "bits," having the structure:

$$se_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field represent the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127 in the eight-bit "single" format and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats, which are generally based on the bit patterns of the bits "$e_{msb} \ldots e_{lsb}$" comprising the exponent field and the bits $f_{msb} \ldots f_{lsb}$ comprising the fraction field. As shown in prior art FIG. 4, if a number is represented such that all of the bits "$e_{msb} \ldots e_{lsb}$" of the exponent field are binary one's (that is, if the bits represent a binary-encoded value of "255" in the single format or "2047" in the double format) and all of the bits $f_{msb} \ldots f_{lsb}$ of the fraction field are binary zeros, then the value of the number is positive infinity 310 or negative infinity 320, depending on the value of the sign bit "s." In particular, the value "v" is $v=(-1)^s \infty$ where "$\infty$" represents the value "infinity." On the other hand, if all of the bits "$e_{msb} \ldots e_{lsb}$" of the exponent field are binary one's and if the bits $f_{msb} \ldots f_{lsb}$ of the fraction field are not all zeros, then the value that is represented is deemed "not a number," abbreviated in the Standard by "NaN" 330.

Figure 4:
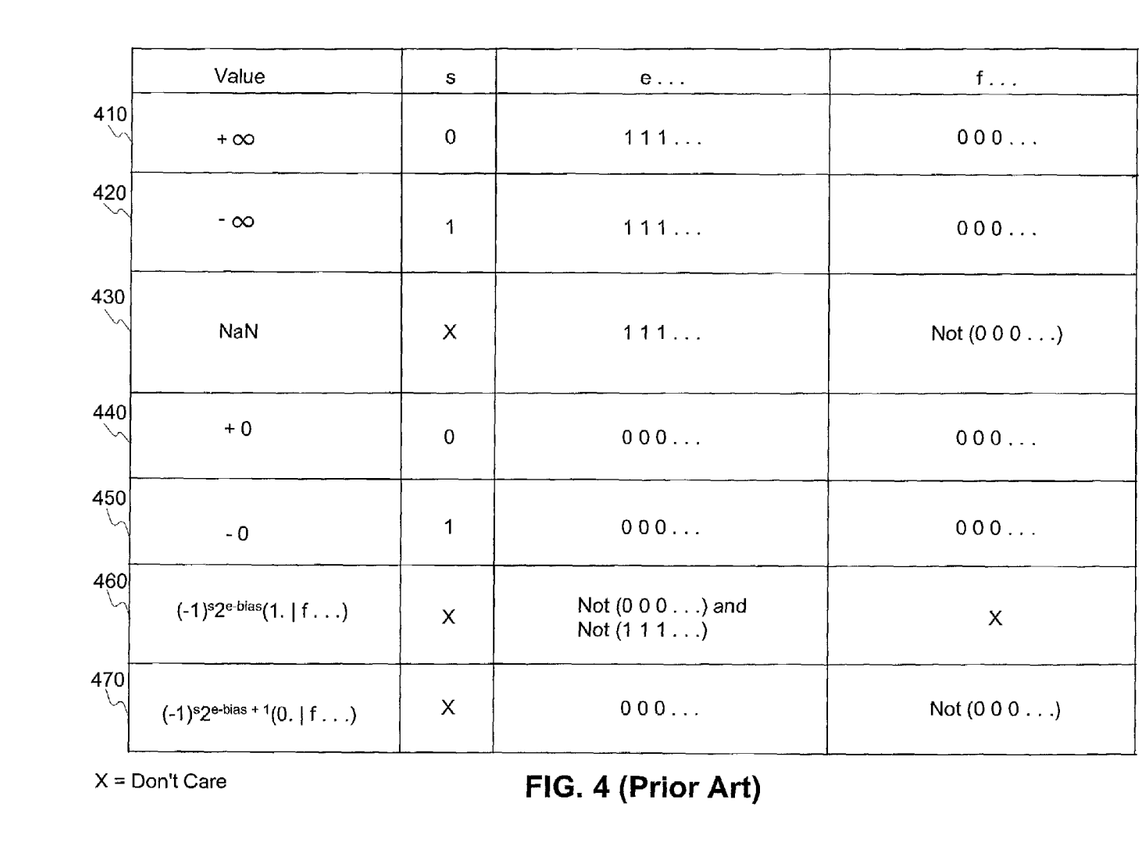
FIG. 4 depicts prior art formats for representations of floating point values.

If a number has an exponent field in which the bits "$e_{msb} \ldots e_{lsb}$" are neither all binary ones nor all binary zeros (that is, if the bits represent a binary-encoded value between 1 and 254 in the single format or between 1 and 2046 in the double format), the number is said to be in a "normalized" format 360. For a number in the normalized format, the value represented by the number is $v=(-1)^s 2^{e-bias}(1.|f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are not all zero, the number is said to be in a "de-normalized" format 370. For a number in the de-normalized format, the value represented by the number is $v=(-1)^s 2^{e-bias+1}(0.|f_{msb} \ldots f_{lsb})$. It will be appreciated that the range of values of numbers that can be expressed in the de-normalized format is disjoint from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero." It will be appreciated that the value "zero" may be positive zero 340 or negative zero 350, depending on the value of the sign bit.

Generally, floating point units to perform computations whose results conform to IEEE Std. 754 are designed to generate a result in response to a floating point instruction in three steps:

(a) First, an approximation calculation step in which an approximation to the absolutely accurate mathematical result (assuming that the input operands represent the specific mathematical values as described by IEEE Std. 754) is calculated. This calculation is sufficiently precise as to allow this accurate mathematical result to be summarized by a sign bit, an exponent (typically represented using more bits than are used for an exponent in the standard floating point format), and some number "N" of bits of the presumed result fraction, plus a guard bit and a sticky bit. The value of the exponent will be such that the value of the fraction generated in step (a) consists of a 1 before the binary point and a fraction after the binary point. The bits are calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 ... and 1.011111 ... as representations of the value "one-and-one-half"); then let the N most significant bits of the infinite significand be used as the intermediate result significand, let the next bit of the infinite significand be the guard bit, and let the sticky bit be 0 if and only if ALL remaining bits of the infinite significand are 0-bits (in other words, the sticky bit is the logical OR of all remaining bits of the infinite fraction after the guard bit).

(b) Second, a rounding step, in which the guard bit, the sticky bit, perhaps the sign bit, and perhaps some of the bits of the presumed significand generated in step (a) are used to decide whether to alter the result of step (a). For the rounding modes defined by IEEE Std. 754, this is a decision as to whether to increase the magnitude of the number represented by the presumed exponent and fraction generated in step (a). Increasing the magnitude of the number is done by adding 1 to the significand in its least significant bit position, as if the significand were a binary integer. It will be appreciated that, if the significand is all 1-bits, then magnitude of the number is "increased" by changing it to a high-order 1-bit followed by all 0-bits and adding 1 to the exponent. It will be further appreciated that, (i) if the result is a positive number, and
    (a) if the decision is made to increase, effectively the decision has been made to increase the value of the result, thereby rounding the result up (that is, towards positive infinity), but
    (b) if the decision is made not to increase, effectively the decision has been made to decrease the value of the result, thereby rounding the result down (that is, towards negative infinity); and
  (ii) if the result is a negative number, and
    (a) if the decision is made to increase, effectively the decision has been made to decrease the value of the result, thereby rounding the result down, but
    (b) if the decision is made not to increase, effectively the decision has been made to increase the value of the result, thereby rounding the result up.

(c) Finally, a packaging step, in which the result is packaged into a standard floating point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, we assume that this is the step that forces the result to be a NaN if any input operand is a NaN. In this step, the decision is also made as to whether the result should be an infinity. It will be appreciated that, if the result is to be a NaN or infinity, any result from step (b) will be discarded and instead the appropriate representation will be provided as the result.

In addition in the packaging step, floating point status information is generated, which is stored in a floating point status register. The floating point status information generated for a particular floating point operation typically includes indications, for example, as to whether (i) a particular operand is invalid for the operation to be performed ("invalid operation");
  (ii) if the operation to be performed is division and the divisor is zero ("division-by-zero");
  (iii) an overflow occurred during the operation ("overflow");
  (iv) an underflow occurred during the operation ("underflow"); and
  (v) the rounded result of the operation is not exact ("inexact").

These conditions are typically represented by flags that are stored in the floating point status register, separate from the floating point operand. The floating point status information can be used to dynamically control the operations taken in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a series or plurality of floating point operations.

IEEE Std. 754 has brought relative harmony and stability to floating point computation and architectural design of floating point units. Moreover, its design was based on some important principles, and rests on a sensible mathematical semantics that eases the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes, which include the rounding mode and may also include a traps enabled/disabled mode, flags representing the floating point status information that is stored in the floating point status register, and traps that are required to implement IEEE Std. 754 introduce implicit serialization between floating point instructions, and between floating point instructions and the instructions that read and write the flags and modes. Rounding modes can introduce implicit serialization because they are typically indicated as global state, although in some microprocessor architectures, the rounding mode is encoded as part of the instruction operation code, which will alleviate this problem to that extent. This implicit serialization makes the Standard difficult to implement coherently in today's superscalar and parallel microprocessor architectures without loss of performance.

Implicit serialization occurs when programmers and designers try to avoid the problems caused if every floating point instruction uses, and can change, the same floating point status register. This can create problems if, for example, two instructions are executing in parallel in a microprocessor architectures featuring several CPUs running at once and both cause an update of the floating point status register. In such a case, the contents of the status register would likely be incorrect with respect to at least one of the instructions, because the other parallel instruction will have written over the original contents. Similar problems can occur in scalar processor architectures, in which several instructions are issued and processed at once. To solve this problem, programmers and designers make sure that floating point instructions that can affect the floating point status register are executed in serial fashion, one instruction completing before another begins.

(ii) The implicit side effects of a procedure that can change the flags or modes can make it very difficult for compilers to perform optimizations on floating point code. To be safe, compilers for most languages assume that every procedure call is an optimization barrier.

(iii) Global flags, such as those that signal certain modes, make it more difficult to do instruction scheduling where the best performance is provided by interleaving instructions of unrelated computations. Instructions from regions of code governed by different flag settings or different flag detection requirements cannot easily be interleaved when they must share a single set of global flag bits.

(iv) Traps have been difficult to integrate efficiently into architectures and programming language designs for fine-grained control of algorithmic behavior.

U.S. patent application Ser. No. 10/035,747, filed on even date herewith in the name of Guy L. Steele Jr. and entitled "Floating Point System That Represents Point Status Flag Information With A Floating Point Operand," describes a floating point unit in which floating point status information is encoded in the representations of the results generated thereby. By encoding the floating point status information relating to a floating point operation in the result that is generated for the operation, the implicit serialization required by maintaining the floating point status information separate and apart therefrom can be obviated. The floating point unit includes a plurality of functional units, including an adder unit, a multiplier unit, a divider unit, a square root unit, a maximum/minimum unit, a comparator unit and a tester unit, all of which operate under control of functional unit control signals provided by a control unit. U.S. patent application Ser. No. 10/035,586, filed on even date herewith in the name of Guy L. Steele, Jr. and entitled "Comparator Unit For Comparing Values Of Floating point Operands," describes a partial order comparator unit for use in connection with the floating point unit described in the aforementioned application that conforms to the requirements of IEEE Std. 754 that:

(i) operands having values −0 and +0 (negative zero and positive zero) are to be considered equal to each other, and (ii) operands representing NaN values be considered "incomparable" (that is, not able to be compared) to any operands, including other NaN operands, regardless of the values represented by the bits comprising the sign, exponent, or fraction field(s) of the NaN operand(s) in the NaN format.

While these requirements are not unreasonable in the context of, for example, floating point computation, it is desirable to relax them under some circumstances, such as, for example, when floating point values are used as sort keys. In that case, it will be desirable to use a consistent total order on all possible floating point values, including −0, +0 and NaN values. The instant application is directed to a total order comparison system that can be used in the floating point unit described in that application, as well as in other conventional floating point units.

Systems and methods consistent with the principles of the present invention provide a total order comparison of operands, as the term "total order" is used in discrete mathematics. Total order refers to a relationship among a set of objects whereby for every pair of objects in the set, there is defined a relationship of "less than," "greater than," or "equal to." In a total order mathematical set, there are no "cannot compare" or "undefined" relationships. In contrast, in a partial order set, a "cannot compare" relationship may exist.

SUMMARY OF THE INVENTION

Embodiments consistent with the principles of the present invention provide new and improved systems and methods for comparing a pair of floating point operands and generating a result that reflects a total ordering of the values of the operands.

In one embodiment consistent with the principles of the present invention, a floating point total order comparator circuit for comparing a first floating point operand and a second floating point operand includes a first analysis circuit for determining a format of the first floating point operand based upon floating point status information encoded within the first floating point operand, a second analysis circuit for determining a format of the second floating point operand based upon floating point status information encoded within the second floating point operand, and a result generator circuit coupled to the analysis circuits for producing a result indicating a total order comparative relationship between the first floating point operand and the second floating point operand based on the format of the first floating point operand and the format of the second floating point operand. Each floating point operand may include a fraction field, an exponent field, and a sign bit. The result may condition the outcome of a floating point instruction. The floating point total order comparator circuit may recognize several predetermined operand formats, such as not-a-number (NaN), infinity, normalized, denormalized, invalid operation, overflow, underflow, division by zero, positive zero, negative zero, exact, and inexact.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
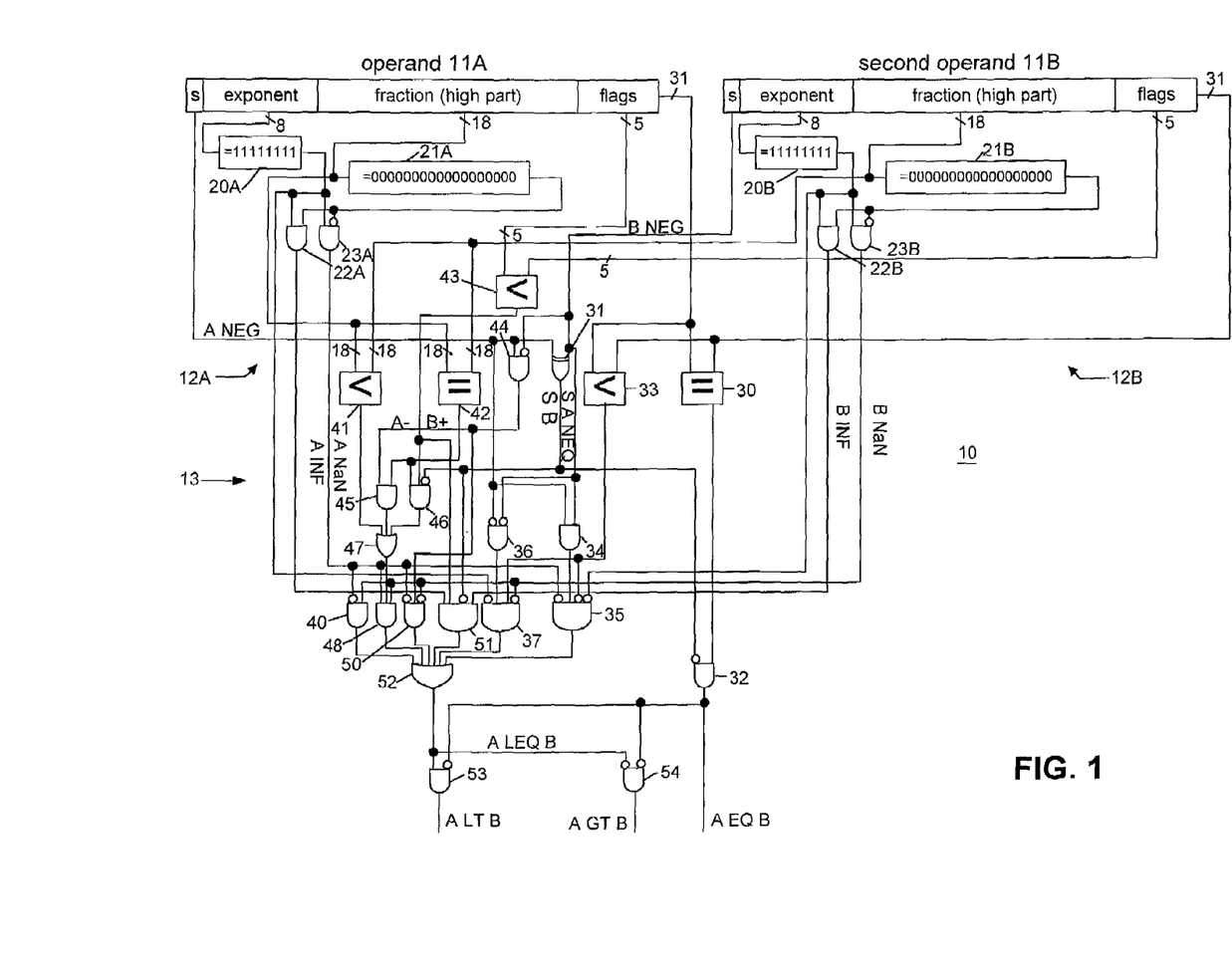
FIG. 1 is a functional block diagram of an exemplary total order comparator unit constructed in accordance with the principles of the invention.

FIG. 1 is a functional block diagram of a total order comparator unit 10 constructed in accordance with the principles of the invention. Generally, the total order comparator unit 10 receives two floating point operands and, in response during a comparison operation, generates signals that indicate whether the value of one operand is greater than the value of the other, the value of one operand is less than the value of the other, or the values of the two operands are equal. Thus, systems and methods consistent with the principles of the present invention provide a total order comparison of operands, as the term "total order" is used in discrete mathematics. Total order refers to a relationship among a set of objects whereby for every pair of objects in the set, there is defined a relationship of "less than," "greater than," or "equal to." In a total order mathematical set, there are no "cannot compare" or "undefined" relationships. In contrast, in a partial order set, a "cannot compare" relationship may exist.

As will be described below, in some cases, operands received by the exemplary total order comparator unit 10 may include floating point status information. In those cases, the floating point status information is encoded in and comprises part of the floating point representation of the operands, as well as the generated result. Since the floating point status information comprises part of the result, instead of being separate and apart from the operands (e.g., in a status register) as in prior art comparator units, the implicit serialization that is required by maintaining the floating point status information separate and apart from the result can be obviated. The total order comparator unit 10 facilitates the comparison of values of the respective operands in a manner so as to accommodate the floating point status information that may be included therein.

Figure 2:
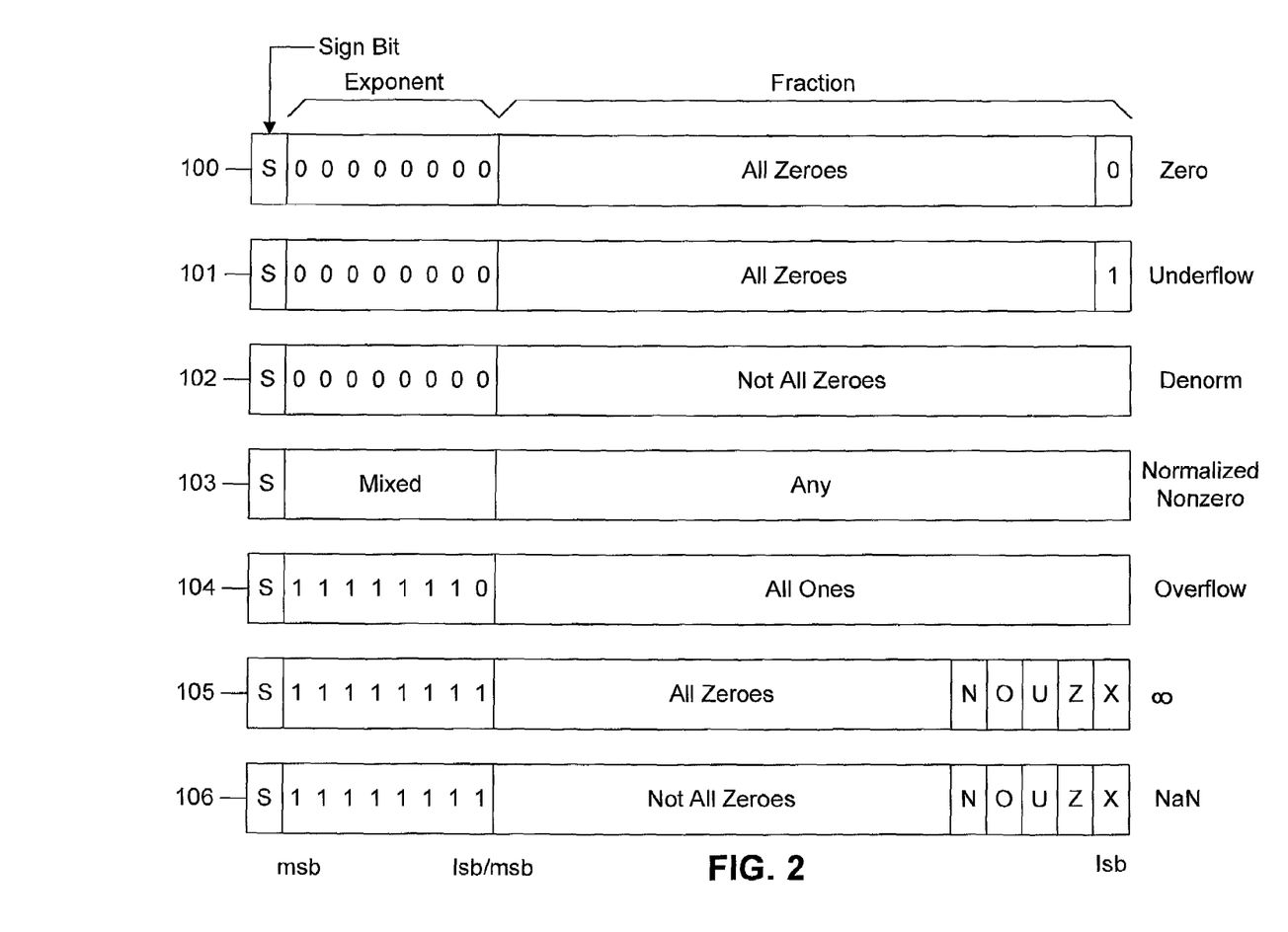
FIG. 2 depicts exemplary formats for representations of floating point values generated by the exemplary comparator unit depicted in FIG. 1.

The exemplary total order comparator circuit 10 encodes the floating point status information in results that are generated in certain formats. FIG. 2 depicts exemplary formats of floating point operands that the total order comparator unit 10 may receive, and of results that it may generate. With reference to FIG. 2, seven exemplary formats are depicted, including a zero format 100, an underflow format 101, a denormalized format 102, a normalized non-zero format 103, an overflow format 104, an infinity format 105 and a not-a-number (NaN) format 106. The zero format 100 is used to represent the values "zero," or, more specifically, positive or negative zero, depending on the value of "s," the sign bit.

The exemplary underflow format 101 provides a mechanism by which the floating point total order comparator circuit 10 can indicate that the result of a computation is an underflow. In the underflow format, the sign bit "s" indicates whether the result is positive or negative, the bits $e_{msb} \ldots e_{lsb}$ of the exponent field are all binary zeros, and the bits $f_{msb} \ldots f_{lsb+1}$ of the fraction field, except for the least significant bit, are all binary zeros. The least significant bit $f_{lsb}$ of the fraction field is a binary one.

The exemplary denormalized format 102 and normalized non-zero format 103 are used to represent finite non-zero floating point values substantially along the lines of that described above in connection with IEEE Std. 754. In both formats 102 and 103, the sign bit "s" indicates whether the result is positive or negative. The bits $e_{msb} \ldots e_{lsb}$ of the exponent field of the denormalized format 102 are all binary zeros, whereas the bits $e_{msb} \ldots e_{lsb}$ of the exponent field of the normalized non-zero format 103 are mixed ones and zeros, except that the exponent field of the normalized non-zero format 103 will not have a pattern in which bits $e_{msb} \ldots e_{lsb+1}$ are all binary ones and the least significant bit $e_{lsb}$ zero and all of the bits $f_{msb} \ldots f_{lsb}$ of the fraction field are all binary ones. In both formats 102 and 103, the bits $f_{msb} \ldots f_{lsb}$ of the fraction field are not all binary zeros.

The exemplary overflow format 104 provides a mechanism by which the floating point total order comparator circuit 10 can indicate that the result of a computation is an overflow. In the overflow format 104 the sign bit "s" indicates whether the result is positive or negative, the bits $e_{msb} \ldots e_{lsb+1}$ of the exponent field are all binary ones, with the least significant bit $e_{lsb}$ being zero. The bits $f_{msb} \ldots f_{lsb}$ of the fraction field are all binary ones.

The exemplary infinity format 105 provides a mechanism by which the floating point total order comparator circuit 10 can indicate that the result is infinite. In the infinity format 105, the sign bit "s" indicates whether the result is positive or negative, the bits $e_{msb} \ldots e_{lsb}$ of the exponent field are all binary ones, and the bits $f_{msb} \ldots f_{lsb+5}$ of the fraction field are all binary zeros. The five least significant bits $f_{lsb+4} \ldots f_{lsb}$ of the fraction field are flags, which will be described below.

The exemplary NaN (not-a-number) format 106 provides a mechanism by which the floating point total order comparator circuit 10 can indicate that the result is not a number. In the NaN format, the sign bit "s" can be any value, the bits $e_{msb} \ldots e_{lsb}$ of the exponent field are all binary ones, and the bits $f_{msb} \ldots f_{lsb+5}$ of the fraction field are not all binary zeros. The five least significant bits $f_{lsb+4} \ldots f_{lsb}$ of the fraction field are flags, which will be described below.

As noted above, in values represented in the infinity format 105 and the NaN format 106, the five low order bits $f_{lsb+4} \ldots f_{lsb}$ of the fraction field are flags. In the formats used with the floating point total order comparator circuit 10, the five flags include the flags that are defined by IEEE Std. 754, including an invalid operation flag "n," an overflow flag "o," an underflow flag "u," a division-by-zero flag "z" and an inexact flag "x." For example, a value in the NaN format 106 in which both the overflow flag "o" and the division-by-zero flag "z" are set indicates that the value represents a result of a computation that involved an overflow (this from the overflow flag "o"), as well as an attempt to divide by zero (this from the division-by-zero flag "z"). It should be noted that the flags provide the same status information as provided by, for example, information stored in a floating point status register in a prior art floating point unit. However, since the information is provided as part of the result and stored therewith in registers in which the result is ultimately stored, multiple instructions can be contemporaneously executed, as the floating point status information that may be generated during execution of one instruction, when stored, will not over-write previously-stored floating point status information generated during execution of another instruction. In addition, in one embodiment, values in the other formats can be indicated as being inexact based in part on the least-significant bit $f_{lsb}$ of their fraction fields, and in that embodiment that bit operates as an inexact flag. The value will be indicated as being inexact if the bit $f_{lsb}$ has the value "one," and otherwise exact.

One of ordinary skill in the art will recognize that the other formats and bit patterns could be used to represent the floating point operand formats without departing from the principles of the present invention. One of ordinary skill in the art will also recognize that the floating point status information contained in the operands could easily be represented by other bit combinations (not shown) without departing from the principles of the present invention. For example, more or fewer bits could be used, a subset or superset of the exemplary status bits could be used, or the most significant bits of an operand (or some other subset of bits) could be used to indicate the floating point status information, instead of the least significant bits illustrated.

With this background the structure and operation of the exemplary total order comparator unit 10 will be described in connection with FIG. 1. With reference to FIG. 1, exemplary total order comparator unit 10, consistent with the principles of the present invention, includes two operand buffers 11A and 11B, respective operand analysis circuits 12A and 12B, and a result generator circuit 13. The operand buffers 11A and 11B receive and store respective operands that may be received from, for example, a set of registers (not shown) in a conventional manner. Each operand analysis circuit 12A, 12B analyzes the operand in the respective operand buffer 11A, 11B and generates signals providing information relating to the respective operands, which signals are provided to the result generator circuit 13. The signals provided by the operand analysis circuit 12A, 12B essentially provide information as to the type of the respective operand, in particular indicating whether the operand is in the infinity format 105 or the NaN format 106. The result generator 13 receives the signals from the operand analysis circuits 12A, 12B and signals representative of the operands in the operand buffers 11A and 11B and generates three result signals, namely an A LT B(operand A is less than operand B) signal, an A GT B (operand A is greater than operand B) signal, and an A EQ B (operand A is equal to operand B) signal, precisely one of which will be asserted to indicate the comparative relationship between the values of the operands in the operand buffers 11A and 11B.

Before proceeding to a detailed description of the operand analysis circuits 12A, 12B and result generator circuit 13, it would be helpful to describe the exemplary result that will be generated by the exemplary total order comparator unit 10 based on the operands in operand buffers 11A, 11B. Generally, and consistent with one embodiment of the present invention:

(a) if the sign bits, bits $e_{msb}$ ... $e_{lsb}$ comprising the exponent fields, and bits $f_{msb}$ ... $f_{lsb}$ of the operands are the same, regardless of the formats of the respective operands and regardless of whether the bits represent floating point status flags, the operands will be considered equal;

(b) an operand having the value +0 (that is, an operand in the zero format 100 with the sign bit clear) is considered as having a larger value than an operand having the value −0 (that is, an operand in the zero format 100 with the sign bit set);

(c) if the operands are in the zero format 100, underflow format 101, denormalized format 102, normalized non-zero format 103, overflow format 104, or infinity format 105, the result will reflect their respective numerical values, with the recognition that:

(I) the magnitude (that is, the absolute value) of an operand in the zero format 100 is less than the magnitude of an operand in the underflow format 101, (II) the magnitude of an operand in the underflow format 101 is less than the magnitude of an operand in the denormalized format 102, (III) the magnitude of an operand in the denormalized format 102 is less than the magnitude of an operand in the normalized non-zero format 103, (IV) the magnitude of an operand in the normalized non-zero format 103 is less than the magnitude of an operand in the overflow format 104, and (V) the magnitude of an operand in the overflow format 104 is less than the magnitude of an operand in the infinity format 105, regardless of the condition of the bits $f_{lsb+4}$ ... $f_{lsb}$ comprising the floating point status flags of the operand in the infinity format;

(d) if both operands are in the infinity format 105 and their sign bits are the same, in considering the binary-encoded values of the bits $f_{lsb+4}$ ... $f_{lsb}$ of the fraction fields of the respective operands, which represent the floating point status flags, the operand with the greater binary-encoded value will be considered to be greater than the other operand;

(e) any operand in the NaN format 106, regardless of sign, is greater than any operand in any other (non-NaN) format; and (f) if both operands are in the NaN format, then (I) if the binary-encoded values of bits $f_{msb}$ ... $f_{lsb+5}$ of the fraction field of the two operands (that is, the portions of the fraction fields except for bits $f_{lsb+4}$ ... $f_{lsb}$ comprising the floating point status flags) are the same, and if the signs of the two operands differ, the positive operand will be considered to be the greater;

(II) if the binary-encoded values of bits $f_{msb}$ ... $f_{lsb+5}$ of the fraction fields of the two operands are not the same, the operand for which the binary-encoded value of bits $f_{msb}$ ... $f_{lsb+5}$ of the fraction field is larger is considered to be the greater (regardless of the sign bits); and (III) if the binary-encoded values of bits $f_{msb}$ ... $f_{lsb+5}$ of the fraction fields of the two operands are the same and the signs are the same, but the binary-encoded values of bits $f_{lsb+4}$ ... $f_{lsb}$ of the fraction fields of the two operands are not the same, the operand for which the binary-encoded value of bits $f_{lsb+4}$ ... $f_{lsb}$ of the fraction field is larger is considered to be the greater.

One of ordinary skill in the art will recognize that the exemplary total order comparator circuit 10 could be easily implemented in alternative embodiments to generate a different result for given operands in operand buffers 11A, 11B, without departing from the principles of the present invention. The circuit could be easily implemented to reflect a different embodiment of the "total order" than the one illustrated by (a) through (f). For example, an alternative embodiment of the total order may be one in which an operand in the negative NaN format 106 (i.e., with the sign bit set) is less than any positive operand in any other format. One of ordinary skill could easily use a new total order result function to meet specific design needs and implement it by changing the particular implementation of the exemplary circuits shown in FIG. 1, or by designing new circuits in accordance with the principles of the present invention.

With this background, referring to FIG. 1, each operand analysis circuit 12A, 12B analyzes the operand in the respective buffer 11A, 11B and generates signals providing information relating thereto, which signals are provided to the result generator 13. In the illustrated embodiment, each exemplary operand analysis circuit 12A, 12B comprises a number of elements, including:

(i) a comparator 20A, 20B that generates an asserted signal if the bits $e_{msb}$ ... $e_{lsb}$ of the exponent field of the operand in respective buffer 11A, 11B are all binary ones, which will be the case if the operand is in the infinity format 105 or the NaN format 106;

(ii) a comparator 21A, 21B that generates an asserted signal if the bits $f_{msb}$ ... $f_{lsb+5}$ of the fraction field of the operand in respective buffer 11A, 11B are all binary zeros, which will be the case if, inter alia, the operand is in the infinity format 105 and will not be the case if, inter alia, the operand is in the NaN format 106;

(iii) an AND gate 22A, 22B that generates an asserted A INF or B INF signal if the comparator 20A, 20B and the comparator 21A, 21B are both generating asserted signals; it will be appreciated that AND gate 22A, 22B will be generating an asserted signal if the operand in operand buffer 11A, 11B is in the infinity format 105; and (iv) a NAND gate 23A, 23B that generates an asserted A NaN or B NaN signal if the comparator 20A, 20B is generating an asserted signal and the comparator 21A, 21B is generating a negated signal; it will be appreciated that AND gate 23A, 23B will be generating an asserted signal if the operand in operand buffer 11A, 11B is in the NaN format 106.

As noted above, the exemplary result generator 13 receives the signals from the operand analysis circuits 12A, 12B and signals representative of the operands in the operand buffers 11A and 11B. Result generator circuit 13 generates three result signals, namely an A LT B (operand A is less than operand B) signal, an A GT B (operand A is greater than operand B) signal, and an A EQ B (operand A is equal to operand B) signal, precisely one of which will be asserted to indicate the total order comparative relationship between the values of the operands in the operand buffers 11A and 11B. In the illustrated embodiment, the result generator 13 includes elements (v) through (xxvi) as follows:

(v) a comparator 30 that generates an asserted signal if the binary-encoded values of the bits $e_{msb} \ldots e_{lsb} f_{msb} \ldots f_{lsb}$ comprising the exponent and fraction fields of the operands in the operand buffers 11A and 11B are the same;

(vi) an XOR gate 31 that generates a negated signal if both an A NEG signal representative of the sign bit in operand buffer 11A and a B NEG signal representative of the sign bit in operand buffer 11B are both asserted, or both negated, which will be the case if the operands in both operand buffers 11A and 11B are negative or if the operands in both operand buffers are positive;

(vii) a NAND gate 32 that generates an asserted A EQ B (operand A equals operand B) signal if the comparator 30 is generating an asserted signal and the XOR gate 31 is generating a negated signal; it will be appreciated that the NAND gate 32 will be generating an asserted A EQ B signal if the operands in the two operand buffers 11A and 11B have the same value (reference item (a) above);

(viii) a comparator 33 that generates an asserted signal if the binary-encoded value of the bits $e_{msb} \ldots e_{lsb}$ and $f_{msb} \ldots f_{lsb}$ comprising the exponent and fraction fields of the operand in operand buffer 11A is less than the binary-encoded value of the value of the same bits of the operand in operand buffer 11B; it will be appreciated that comparator 33 will be generating an asserted signal if the magnitude of the operand in operand buffer 11B is greater than the magnitude of the operand in operand buffer 11A;

(ix) an AND gate 34 that generates an asserted signal if both the A NEG and the B NEG signals are asserted; it will be appreciated that the AND gate 34 will be generating an asserted signal if the operands in both operand buffers are negative;

(x) a NAND gate 35 that generates an asserted signal if the A NaN signal from NAND gate 23A is negated, the signal generated by comparator 20B is negated, the signal generated by comparator 33 is negated, and the signal generated by AND gate 34 is asserted; it will be appreciated that NAND gate 35 will be generating an asserted signal if the operands in both operand buffers 11A and 11B are negative, the magnitude of the operand in operand buffer 11B is less than or equal to the magnitude of the operand in operand buffer 11A, the operand in operand buffer 11A is not in the NaN format 106, and the operand in operand buffer 11B is not in either the infinity format 105 or the NaN format 106, in which case the value of the operand in operand buffer 11A will be less than or equal to the value of the operand in operand buffer 11B (reference items (b) and (c) above);

(xi) a NAND gate 36 that generates an asserted signal if both the A NEG and the B NEG signals are negated; it will be appreciated that the AND gate 34 will be generating an asserted signal if the operands in both operand buffers are positive;

(xii) a NAND gate 37 that generates an asserted signal if the comparator 20A is generating a negated signal, the B NaN signal from NAND gate 23B is negated, and the signals generated by comparator 33 and NAND gate 36 are both asserted; it will be appreciated that NAND gate 35 will be generating an asserted signal if the operands in both operand buffers 11A, 11B are positive, the magnitude of the operand in operand buffer 11B is greater than the magnitude of the operand in operand buffer 11A, the operand in operand buffer 11B is not in the NaN format 106, and the operand in operand buffer 11A is not in either the infinity format 105 or the NaN format 106, in which case the value of the operand in operand buffer 11A will be less than or equal to the value of the operand in operand buffer 11B (reference items (b) and (c) above);

(xiii) a NAND gate 40 that generates an asserted signal if the A NaN signal from NAND gate 23A is negated and the B NaN signal from NAND gate 23B is asserted; it will be appreciated that the NAND gate 40 will be generating an asserted signal if the operand in operand buffer 11A is not in the NaN format 106 and the operand in operand buffer 11B is in the NaN format 106 (reference item (e) above);

(xiv) a comparator 41 that generates an asserted signal if the binary-encoded value represented by signals representative of the bits $f_{msb} \ldots f_{lsb+5}$ of the fraction field of the operand in operand buffer 11A is less than the binary-encoded value represented by signals representative of the bits $f_{msb} \ldots f_{lsb+5}$ of the fraction field of the operand in operand buffer 11B;

(xv) a comparator 42 that generates an asserted signal if the binary-encoded value represented by signals representative of the bits $f_{msb} \ldots f_{lsb+5}$ of the fraction field of the operand in operand buffer 11A is equal to the binary-encoded value represented by signals representative of the bits $f_{msb} \ldots f_{lsb+5}$ of the fraction field of the operand in operand buffer 11B;

(xvi) a comparator 43 that generates an asserted signal if the binary-encoded value represented by signals representative of the bits $f_{lsb+4} \ldots f_{lsb}$ of the fraction field of the operand in operand buffer 11A is less than the binary-encoded value represented by signals representative of the bits $f_{lsb+4} \ldots f_{lsb}$ of the fraction field of the operand in operand buffer 11B; it will be appreciated that, if the operands in operand buffers 11A and 11B are in the infinity format 105 or the NaN format 106, the bits $f_{lsb+4} \ldots f_{lsb}$ correspond to the flags "n," "o," "u," "z" and "x," respectively;

(xvii) a NAND gate 44 that generates an asserted A−B+ (operand A negative, operand B positive) signal if the A NEG signal is asserted and the B NEG signal is negated; it will be appreciated that the NAND gate 44 will be generating an asserted signal if the operand in operand buffer 11A is negative and the operand in operand buffer 11B is positive;

(xviii) an AND gate 45 that generates an asserted signal if both the comparator 42 and the NAND gate 44 are generating asserted signals; it will be appreciated that the AND gate 45 will be generating an asserted signal if the binary-encoded value of bits $f_{msb} \ldots f_{lsb+5}$ of the fraction field of the operand in operand buffer 11A is equal to the binary-encoded value of the corresponding bits of the operand in operand buffer 11B, and the operand in operand buffer 11A is negative while the operand in operand buffer 11B is positive;

(xix) a NAND gate 46 that generates an asserted signal if the comparator 42 and comparator 43 are generating asserted signals and the XOR gate 31 is generating a negated SA NEQ SB (sign operand A not equal to sign operand B) signal; it will be appreciated that the NAND gate 46 will be generating an asserted signal if the operands in the operand buffers 11A and 11B have the same sign, the binary-encoded values of the bits $f_{msb} \ldots f_{lsb+5}$ of the operands in the operand buffers 11A and 11B are the same, and the binary-encoded value of the bits $f_{lsb+4} \ldots f_{lsb}$ of the operand in operand buffer 11A is less than the binary-encoded value of the corresponding bits of the operand in operand buffer 11B;

(xx) an OR gate 47 that generates an asserted signal if any of comparator 41, AND gate 45 or NAND gate 46 is generating an asserted signal;

(xxi) an AND gate 48 that generates an asserted signal if NAND gates 23A and 23B are generating respective asserted A NaN and B NaN signals and OR gate 47 is generating an asserted signal; it will be appreciated that AND gate 48 will be generating an asserted signal if the operands in both operand buffers 11A and 11B are in the NaN format 106 and either:
  (A) the binary-encoded value of the bits $f_{msb} \ldots f_{lsb+5}$ of the fraction field of the operand in operand buffer 11A is less than the binary-encoded value of the bits $f_{msb} \ldots f_{lsb+5}$ of the fraction field of the operand in operand buffer 11B (reference comparator 41 and item (f)(I) above); or
  (B) the binary-encoded value of the bits $f_{msb} \ldots f_{lsb+5}$ of the fraction field of the operand in operand buffer 11A equals the binary-encoded value of the bits $f_{msb} \ldots f_{lsb+5}$ of the fraction field of the operand in operand buffer 11B, and the operand in operand buffer 11A is negative while the operand in operand buffer 11B is positive (reference AND gate 45 and item (f)(II) above); or
  (C) the signs of the operands in both operand buffers 11A and 11B are the same, and the binary-encoded value of the bits $f_{msb} \ldots f_{lsb+5}$ of the fraction field of the operand in operand buffer 11A equals the binary-encoded value of the bits $f_{msb} \ldots f_{lsb+5}$ of the fraction field of the operand in operand buffer 11B, but the binary-encoded value of the bits $f_{lsb+4} \ldots f_{lsb}$ of the fraction field of the operand in operand buffer 11A is less than the binary-encoded value of the bits $f_{lsb+4} \ldots f_{lsb}$ of the fraction field of the operand in operand buffer 11B (reference NAND gate 46 and item (f)(III) above);

(xxii) a NAND gate 50 that generates an asserted signal if the NAND gates 23A and 23B are generating negated A NaN and B NaN signals and if the NAND gate 44 is generating an asserted A– B+ (operand A negative, operand B positive) signal; it will be appreciated that AND gate 50 will be generating an asserted signal if neither operand is in the NaN format 106 and the operand in operand buffer 11A is negative and the operand in operand buffer 11B is positive, which will ensure that all other operands, except operands in the NaN format 106, that are negative will be less than all operands, other than operands in the NaN format 106, that are positive (reference items (b) and (c) above);

(xxiii) a NAND gate 51 that generates an asserted signal if the AND gates 22A and 22B are generating asserted A INF and B INF signals, XOR gate 31 is generating a negated SA NEQ SB (sign operand A not equal to sign operand B) signal, and comparator 43 is generating an asserted signal; it will be appreciated that NAND gate 51 will be generating an asserted signal if the operands in both operand buffers 11A and 11B are in the infinity format 105, the signs of the operands are the same, and the binary-encoded value of bits $f_{lsb+4} \ldots f_{lsb}$ of the fraction field of the operand in operand buffer 11A (which represents the operand's floating point status flags) is less than the binary-encoded value of bits $f_{lsb+4} \ldots f_{lsb}$ of the fraction field of the operand in operand buffer 11B (reference item (d) above);

(xxiv) an OR gate 52 that generates an asserted signal if any of NAND gates 35, 37, 40, 50 or 51 or AND gate 48 is generating an asserted signal; it will be appreciated that the OR gate 52 will be generating an asserted signal if:
  (A) the operands in both operand buffers 11A, 11B are negative, the magnitude of the operand in operand buffer 11B is less than or equal to the magnitude of the operand in operand buffer 11A, the operand in operand buffer 11A is not in the NaN format 106 and the operand in operand buffer 11B is not in either the infinity format 105 or the NaN format 106, in which case the value of the operand in operand buffer 11A will be less than or equal to the value of the operand in operand buffer 11B (reference NAND gate 35, items (a) and (b) above);
  (B) the operands in both operand buffers 11A, 11B are positive, the magnitude of the operand in operand buffer 11B is greater than the magnitude of the operand in operand buffer 11A, the operand in operand buffer 11B is not in the NaN format 106, and the operand in operand buffer 11A is not in either the infinity format 105 or the NaN format 106, in which case the value of the operand in operand buffer 11A will be less than or equal to the value of the operand in operand buffer 11B (reference NAND gate 37, items (a) and (b) above);
  (C) the operand in operand buffer 11A is not in the NaN format 106 and the operand in operand buffer 11B is in the NaN format 106 (reference NAND gate 40, item (e) above);
  (D) the operands in both operand buffers 11A and 11B are in the NaN format 106 (reference AND gate 48) and either:
    (1) the binary-encoded value of the bits $f_{msb} \ldots f_{lsb+5}$ of the fraction field of the operand in operand buffer 11A is less than the binary-encoded value of the bits $f_{msb} \ldots f_{lsb+5}$ of the fraction field of the operand in operand buffer 11B (reference comparator 41, item (f)(I) above);
    (2) the binary-encoded value of the bits $f_{msb} \ldots f_{lsb+5}$ of the fraction field of the operand in operand buffer 11A equals the binary-encoded value of the bits $f_{msb} \ldots f_{lsb+5}$ of the fraction field of the operand in operand buffer 11B, but the operand in operand buffer 11A is negative while the operand in operand buffer 11B is positive (reference AND gate 45 above, item (f)(II) above); or
    (3) the signs of the operands in both operand buffers 11A and 11B are the same, and the binary-encoded value of the bits $f_{msb} \ldots f_{lsb+5}$ of the fraction field of the operand in operand buffer 11A equals the binary-encoded value of the bits $f_{msb} \ldots f_{lsb+5}$ of the fraction field of the operand in operand buffer 11B, but the binary-encoded value of the bits $f_{lsb+4} \ldots f_{lsb}$ of the fraction field of the operand in operand buffer 11A is less than the binary-encoded value of the bits $f_{lsb+4} \ldots f_{lsb}$ of the fraction field of the operand in operand buffer 11B (reference AND gate 46, item (f)(III) above);
  (E) neither operand is in the NaN format 106 and the operand in operand buffer 11A is negative and the operand in operand buffer 11B is positive, which will ensure that all operands (other than those in the NaN format 106) that are negative will be less than all operands (other than operands in NaN format 106) that are positive (reference NAND gate 50, items (b) and (c) above); or (F) the operands in both operand buffers 11A and 11B are in the infinity format 105, and the signs of the operands are the same, and the binary-encoded value of bits $f_{lsb+4} \ldots f_{lsb}$ of the fraction field of the operand in operand buffer 11A (which represents the operand's flags) is less than the binary-encoded value of bits $f_{lsb+4} \ldots f_{lsb}$ of the fraction field of the operand in operand buffer 11B (reference NAND gate 51, item (d) above).

(xxv) a NAND gate 53 that generates an asserted A LT B (operand A less than operand B) signal if the OR gate 52 is generating an asserted signal and the NAND gate 32 is generating a negated signal; it will be appreciated that the NAND gate 53 will be generating an asserted signal whenever the OR gate 52 is generating an asserted signal as described in connection with item (xxiv) above, except when NAND gate 35 is generating an asserted signal because the magnitude of the operand in operand buffer 11A equals the magnitude of the operand in operand buffer 11B (reference item (xxiv)(A) above); and (xxvi) a NAND gate 54 that generates an asserted A GT B (operand A greater than operand B) signal if the OR gate 52 and the NAND gate 32 are both generating negated signals; it will be appreciated that the NAND gate 54 will be generating an asserted signal whenever the OR gate 52 is generating a negated signal as described in connection with item (xxiv) above, except when NAND gate 32 is generating an asserted signal because the magnitude of the operand in operand buffer 11A equals the magnitude of the operand in operand buffer 11B (reference item (xxiv)(A) above).

As noted above, the exemplary total order comparator unit 10 can provide the A LT B, A GT B, and A EQ B signals to a control unit for controlling a floating point unit that includes the total order comparator unit 10, as described in the aforementioned related application.

Systems consistent with the principles of the invention provides a number of features. In particular, such systems provide a total order comparator unit 10 that provides comparisons that indicate a consistent total order on all possible floating point values, including −0, +0, and NaN values for operands for which floating point status information forms part of respective ones of the operands.

Figure 3:
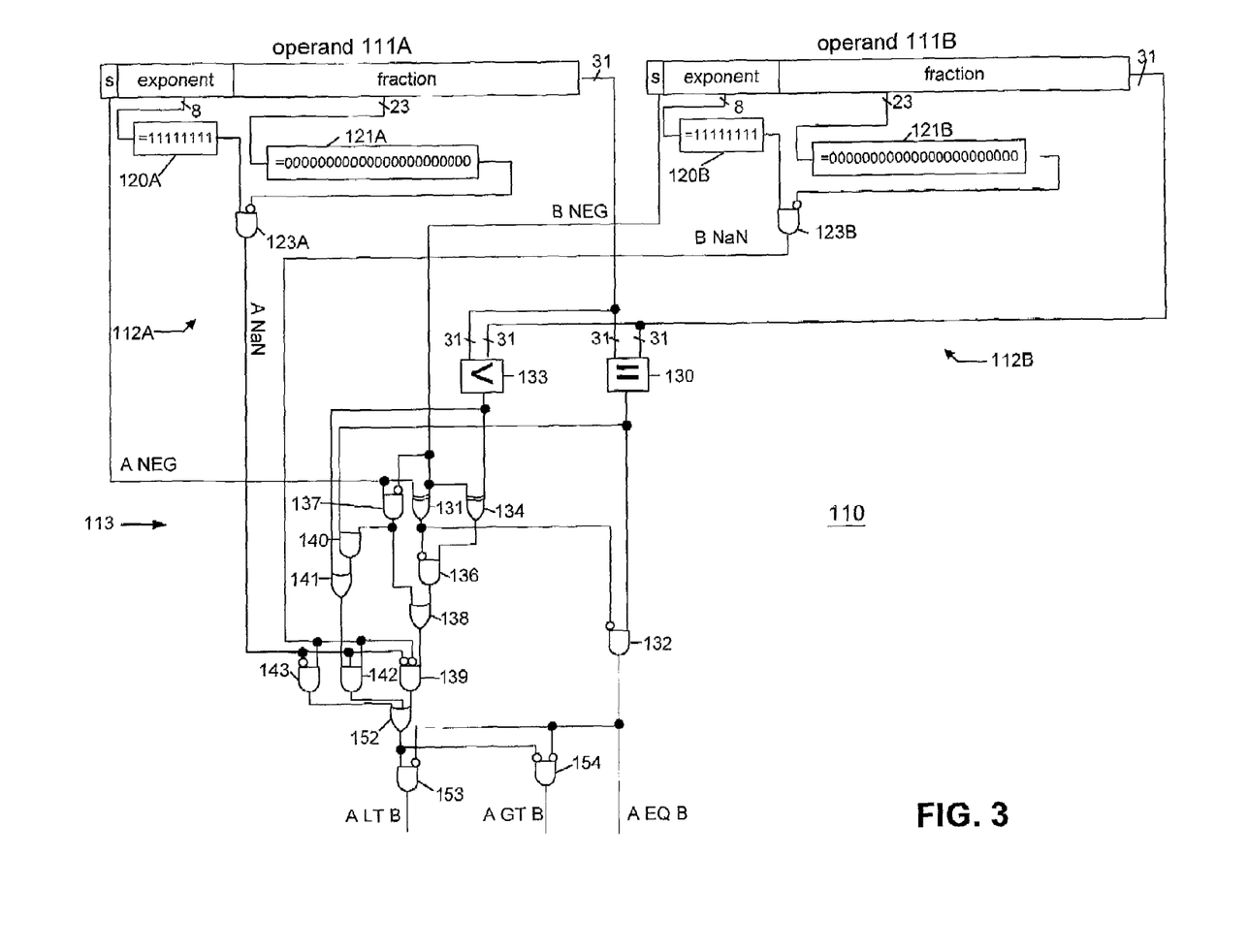
FIG. 3 is a functional block diagram of a second exemplary embodiment of a total order comparator unit constructed in accordance with the principles of the invention.

The exemplary total order comparator unit 10 described above in connection with FIG. 1 is designed to accommodate operands wherein the floating point status flags form part of the operands in several of the formats. FIG. 3 depicts another exemplary total order comparator unit 110 that can be used in floating point units that conform to existing IEEE STD. 754 operands, in which floating point status information does not form part of the respective operands, but instead is maintained separate and apart from the operands. With reference to the embodiment illustrated in FIG. 3, exemplary total order comparator unit 110 includes two operand buffers 111A and 111B, respective operand analysis circuits 112A and 112B, and a result generator circuit 113. The operand buffers 111A and 111B receive and store respective operands that may be received from, for example, a set of registers (not shown) in a conventional manner. Each operand analysis circuit 112A, 112B analyzes the operand in the respective operand buffer 111A, 111B and generates signals providing information relating to the respective operands, which signals are provided to the result generator 113. The signals provided by the operand analysis circuit 112A, 112B essentially provide information as to the type of the respective operand, in particular indicating whether the operand is an NaN format. The result generator 113 receives the signals from the operand analysis circuits 112A, 112B and signals representative of the operands in the operand buffers 111A and 111B. Result generator circuit 113 generates three result signals, namely an A LT B (operand A is less than operand B) signal, an A GT B (operand A is greater than operand B) signal, and an A EQ B (operand A is equal to operand B) signal, precisely one of which will be asserted to indicate the total order comparative relationship between the values of the operands in the operand buffers 111A and 111B.

Before proceeding to a detailed description of the exemplary operand analysis circuits 112A, 112B and result generator 113, it would be helpful to describe the result that will be generated by the exemplary total order comparator unit 110 based on the operands in operand buffers 111A, 111B. Generally, and consistent with one embodiment of the present invention:

(a) if the sign bits, bits $e_{msb} \ldots e_{lsb}$ comprising the exponent fields and $f_{msb} \ldots f_{lsb}$ of the operands are the same, regardless of the values of the respective operands, they will be considered equal;

(b) an operand having the value +0 is considered as having a larger value than an operand having the value −0;

(c) if neither operand is a NaN, the result will reflect their respective numerical values;

(d) any operand in the NaN format 106, regardless of sign, is greater than any operand in any other format; and (e) if both operands are NaN's, the result will reflect the binary-encoded values of the bits comprising the respective operands, (I) excluding the signs of the respective operands if the magnitudes are not equal, but (II) including the signs of the respective operands if the magnitudes are equal.

With this background, referencing FIG. 3, each exemplary operand analysis circuit 112A, 112B analyzes the operand in the respective buffer 111A, 111B and generates signals providing information relating thereto, which signals are provided to the result generator circuit 113. In the illustrated embodiment, each operand analysis circuit 112A, 112B, comprises a number of elements, including:

(i) a comparator 120A, 120B that generates an asserted signal if the bits $e_{msb} \ldots e_{lsb}$ of the exponent field of the operand in respective buffer 111A, 111B are all binary ones, which will be the case if the operand is, inter alia, a NaN;

(ii) a comparator 121A, 121B that generates an asserted signal if the bit $f_{msb} \ldots f_{lsb}$ of the fraction field of the operand in respective buffer 11A, 11B are all binary zeros, which will not be the case if the operand is, inter alia, a NaN;

(iii) a NAND gate 123A, 123B that generates an asserted A NaN or B NaN signal if the comparator 120A, 120B is generating an asserted signal and the comparator 121A, 121B is generating a negated signal; it will be appreciated that NAND gate 123A, 123B will be generating an asserted signal if the operand in operand buffer 111A, 111B is a NaN.

As noted above, the result generator 113 receives the signals from the operand analysis circuits 112A, 112B and signals representative of the operands in the operand buffers 111A and 111B and generates three result signals, namely an A LT B (operand A is less than operand B) signal, an A GT B (operand A is greater than operand B) signal, and an A EQ B (operand A is equal to operand B) signal, precisely one of which will be asserted to indicate the total order comparative relationship between the values of the operands in the operand buffers 111A and 111B. In the illustrated embodiment, the result generator 113 includes:

(iv) a comparator 130 that generates an asserted signal if the binary-encoded values of the bits $e_{msb} \ldots e_{lsb} f_{msb} \ldots f_{lsb}$ comprising the exponent and fraction fields of the operands in the operand buffers 11A and 11B are the same;

(v) an XOR gate 131 that generates a negated signal if an A NEG signal representative of the sign bit in operand buffer 111A and a B NEG signal representative of the sign bit in operand buffer 111B are both asserted, or both negated, which will be the case if the operands in both operand buffers 111A and 111B are negative or if the operands in both operand buffers are positive;

(vi) a NAND gate 132 that generates an asserted A EQ B (operand A equals operand B) signal if the comparator 130 is generating an asserted signal and the XOR gate 131 is generating a negated signal; it will be appreciated that the NAND gate 132 will be generating an asserted A EQ B signal if the operands in the two operand buffers 111A and 111B have the same value (reference item (a) directly above);

(vii) a comparator 133 that generates an asserted signal if the binary-encoded value of the bits $e_{msb} \ldots e_{lsb}$ and $f_{msb} \ldots f_{lsb}$ comprising the exponent and fraction fields of the operand in operand buffer 111A is less than the binary-encoded value of the value of the same bits of the operand in operand buffer 111B; it will be appreciated that comparator 133 will be generating an asserted signal if the magnitude of the operand in operand buffer 111B is greater than the operand in operand buffer 111A;

(viii) an XOR gate 134 that generates an asserted signal if a B NEG signal representative of the sign bit of the operand in operand buffer 111B is negated and the comparator 133 is generating an asserted signal, or if the B NEG signal is asserted and the comparator 133 is generating a negated signal; it will be appreciated that the XOR gate 134 will be generating an asserted signal if:

(A) the operand in operand buffer 111B is negative and the magnitude of the operand in operand buffer 111B is less than the magnitude of the operand in operand buffer 111A, in which case the value of the operand in operand buffer 111A is less than the value of the operand in operand buffer 111B if the operand in operand buffer 111A is negative, or (B) the operand in operand buffer 111B is positive and the magnitude of the operand in operand buffer 111A is less than the magnitude of the operand in operand buffer 111B, in which case the value of the operand in operand buffer 111A is less than the value of the operand in operand buffer 111B, note that representations of operands that are NaNs are considered as if they represented numerical values;

(ix) a NAND gate 136 that generates an asserted signal if the XOR gate 131 is generating a negated signal and the XOR gate 134 is generating an asserted signal; it will be appreciated that the NAND gate 136 will be generating an asserted signal if both operands are of the same sign and the value of the operand in operand buffer 111A is less than the value of the operand in operand buffer 111B, with representations of operands that are NaN's being considered to represent numerical values (reference item (c) directly above);

(x) a NAND gate 137 that generates an asserted signal if the A NEG signal is asserted and the B NEG signal is negated; it will be appreciated that the NAND gate 137 will be generating an asserted signal if the operand in operand buffer 111A is negative and the operand in operand buffer 111B is positive (reference items (b) and (c) directly above);

(xi) an OR gate 138 that generates an asserted signal if either NAND gate 136 or NAND gate 137 is generating an asserted signal; it will be appreciated that OR gate 138 will be generating an asserted signal either if the operand in operand buffer 111A is negative and the operand in operand buffer 111B is positive (reference NAND gate 137), or if the operands in the operand buffers have the same sign and the operand in operand buffer 111A is less than the operand in operand buffer 111B (reference NAND gate 136);

(xii) a NAND gate 139 that generates an asserted signal if OR gate 138 is generating an asserted signal and both the A NaN signal from NAND gate 123A and the B NaN signal from NAND gate 123B are negated; it will be appreciated that the NAND gate 139 will be generating an asserted signal if neither operand is a NaN and the operand in operand buffer 111A is less than the operand in operand buffer 111B (reference item (c) directly above);

(xiii) an AND gate 140 that generates an asserted signal if the comparator 130 and NAND gate 137 are both generating an asserted signal; it will be appreciated that the AND gate 140 will be generating an asserted signal if the operands in the operand buffers 111A and 111B have the same magnitude, and the operand in operand buffer 111B is positive and the operand in operand buffer 111A is negative (reference item (e)(II) directly above);

(xiv) an OR gate 141 that generates an asserted signal if either the comparator 133 is generating an asserted signal or the AND gate 140 is generating an asserted signal; it will be appreciated that the OR gate 141 will be generating an asserted signal if:

(I) the operands in the operand buffers 111A and 111B have the same magnitude, but the operand in operand buffer 111B is positive and the operand in operand buffer 111A is negative (reference item (e)(II) directly above), or (II) the magnitude of the operand in operand buffer 111A is less than the magnitude of the operand in operand buffer 111B (reference item (e)(I) directly above);

(xv) an AND gate 142 that generates an asserted signal if the OR gate 141 is generating an asserted signal, and if AND gate 123A and AND gate 123B are both generating asserted signals indicating that both operands are NaNs;

(xvi) a NAND gate 143 that generates an asserted signal if the NAND gate 123A is generating a negated signal and the NAND gate 123B is generating an asserted signal; it will be appreciated that the NAND gate 143 will be generating an asserted signal if the operand in operand buffer 111A is not a NaN and the operand in operand buffer 111B is a NaN (reference item (d) directly above);

(xvii) an OR gate 152 that generates an asserted signal if any of gates 139, 142 or 143 is generating an asserted signal; it will be appreciated that the OR gate 152 will be generating an asserted signal if:

(I) neither operand is a NaN and the operand in operand buffer 111A is less than the operand in operand buffer 111B (reference NAND gate 139 and items (b) and (c) directly above), or (II) both operands are NaNs and
 (A) the operands in the operand buffers 111A and 111B have the same magnitude, and the operand in operand buffer 111B is positive and the operand in operand buffer 111A is negative (reference item (e)(II) directly above), or (B) the magnitude of the operand in operand buffer 111A is less than the magnitude of the operand in operand buffer 111B (reference AND gate 142 item (e)(I) directly above), or (III) the operand in operand buffer 111A is not a NaN and the operand in operand buffer 111B is a NaN (reference NAND gate 143 and item (d) directly above);

(xviii) a NAND gate 153 that generates an asserted A LT B (operand A less than operand B) signal if the OR gate 152 is generating an asserted signal and the NAND gate 132 is generating a negated signal;

(xix) a NAND gate 154 that generates an asserted A GT B (operand A greater than operand B) signal if the OR gate 152 and NAND gate 132 are both generating negated signals; the NAND gate 154 makes use of the signal from NAND gate 132 since the signal from OR gate 152 can be negated if the sign bits, bits $e_{msb} \ldots e_{lsb}$ comprising the exponent fields and $f_{msb} \ldots f_{lsb}$ of the operands are the same (reference item (a) directly above).

One of ordinary skill in the art will recognize that the circuits implementing the comparative relationships between the operands specified in the preceding descriptions to produce the result can easily be altered to implement different comparative relationships and generate different results without departing from the principles of the present invention. For example, the relationships in an alternative embodiment may be defined and implemented so that the generated result is A EQ B if operand A is in the positive zero format and operand B is in the negative zero format, instead of generating an A GT B result as is done by the exemplary circuits of the illustrated embodiment.

It will be further appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided to the system over a network or other mechanism for transferring information in a conventional manner. In addition, it will be appreciated that the system may be operated and/or otherwise controlled by means of information provided by an operator using operator input elements (not shown), which may be connected directly to the system or which may transfer the information to the system over a network or other mechanism for transferring information in a conventional manner.

Those skilled in the art will appreciate that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

The foregoing description has been limited to specific embodiments of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A floating point total order comparator circuit for comparing a first floating point operand and a second floating point operand, comprising:

a first analysis circuit for determining a format of the first floating point operand based upon floating point status information encoded within the first floating point operand;

a second analysis circuit for determining a format of the second floating point operand based upon floating point status information encoded within the second floating point operand; and a result generator circuit coupled to the analysis circuits for producing a result indicating a total order comparative relationship between the first floating point operand and the second floating point operand based on the format of the first floating point operand and the format of the second floating point operand wherein the format represents a combination of at least two of a group comprising: not-a-number (NaN), infinity, normalized, denormalized, invalid operation, overflow, underflow, division by zero, positive zero, negative zero exact, and inexact.

2. The floating point total order comparator circuit of claim 1, further comprising:

a first operand buffer coupled to the first analysis circuit, for supplying the first floating point operand to the first analysis circuit; and a second operand buffer coupled to the second analysis circuit, for supplying the second floating point operand to the second analysis circuit.

3. The floating point total order comparator circuit of claim 1, wherein the result indicating the total order comparative relationship between the first floating point operand and the second floating point operand comprises at least one of the group comprising: the first operand is less than the second operand, the first operand is greater than the second operand, and the first operand is equal to the second operand.

4. The floating point total order comparator circuit of claim 1, wherein the total order comparative relationship indicates that if the first floating point operand has the positive NaN format and the second floating point operand has the negative NaN format, and the first floating point operand contains the same value as the second floating point operand, ignoring the encoded status information in each, then the first floating point operand is greater than the second floating point operand.

5. The floating point total order comparator circuit of claim 1, wherein the total order comparative relationship indicates that if the first floating point operand has the NaN format and the second floating point operand has the NaN format, and the two floating point operands contain the same value in a fraction field, an exponent field, and a sign bit of the respective floating point operands, then the one of the two floating point operands containing a larger value in the encoded status information in each is greater than the other of the two floating point operands.

6. A floating point total order comparator circuit for comparing a first floating point operand and a second floating point operand, comprising:

a first analysis circuit for determining a format of the first floating point operand based upon floating point status information encoded within the first floating point operand;

a second analysis circuit for determining a format of the second floating point operand based upon floating point status information encoded within the second floating point operand; and a result generator circuit coupled to the analysis circuits for producing a result indicating a total order comparative relationship between the first floating point operand and the second floating point operand based on the format of the first floating point operand and the format of the second floating point operand;

wherein the format is from a group comprising: not-a-number (NaN), infinity, normalized, denormalized, invalid operation, overflow, underflow, division by zero, positive zero, negative zero, exact, and inexact; and wherein the total order comparative relationship represents one of a group comprising:

a relationship between the first floating point operand having the NaN format and the second floating point operand having the NaN format;

a relationship between having first floating point operand having the NaN format and the second floating point operand not having the NaN format; and a relationship between having a first floating point operand not having the NaN format and the second floating point operand having the NaN format.

7. The floating point total order comparator circuit of claim 6 wherein the format represents one of a positive overflow (+OV) and a negative overflow (−OV).

8. The floating point total order comparator circuit of claim 6 wherein the format represents one of a positive underflow (+UN) and a negative underflow (−UN).

9. The floating point total order comparator circuit of claim 6, wherein the format represents one of a positive infinity and a negative infinity.

10. The floating point total order comparator circuit of claim 6, wherein the result is used to condition an outcome of a floating point instruction.

11. The floating point total order comparator circuit of claim 6, wherein the total order comparative relationship indicates that:

the first floating point operand having the positive zero format is greater than the second floating point operand having the negative zero format.

12. A floating point total order comparator circuit for comparing a first floating point operand and a second floating point operand, comprising:

a first analysis circuit for determining a format of the first floating point operand based upon floating point status information encoded within the first floating point operand;

a second analysis circuit for determining a format of the second floating point operand based upon floating point status information encoded within the second floating point operand; and a result generator circuit coupled to the analysis circuits for producing a result indicating a total order comparative relationship between the first floating point operand and the second floating point operand based on the format of the first floating point operand and the format of the second floating point operand, wherein the total order comparative relationship indicates that if the first floating point operand has the NaN format and the second floating point operand has the NaN format, then the one of the two floating point operands containing a larger value in a fraction field of the two floating point operands, ignoring the encoded status information in each, is greater than the other of the two floating point operands, regardless of a respective sign bit of each floating point operand.

13. A method for comparing a first floating point operand and a second floating point operand according to a pre-defined total order comparative relationship, comprising:

receiving the first floating point operand and the second floating point operand;

determining a first floating point format of the first floating point operand from floating point status information encoded within the first floating point operand;

determining a second floating point format of the second floating point operand from floating point status information encoded within the second floating point operand; and generating a result indicating the total order comparative relationship between the first floating point operand and the second floating point operand based on the first floating point format and the second floating point format, wherein the first floating point format and the second floating point format are from a group comprising: not-a-number (NaN), infinity, normalized, denormalized, invalid operation, overflow, underflow, division by zero, positive zero, negative zero, exact, and inexact; and wherein the total order comparative relationship indicates represents one of a group comprising:

a relationship between the first floating point operand having the NaN format and the second floating point operand having the NaN format;

a relationship between the first floating point operand having the NaN format and the second floating point operand not having the NaN format; and a relationship between the first floating point operand not having the NaN format and the second floating point operand having the NaN format.

14. The method of claim 13, further comprising:

conditioning the outcome of a floating point instruction based upon the result generated.

15. The method of claim 13, wherein the group further comprises: positive overflow (+OV) and negative overflow (−OV).

16. The method of claim 13, wherein the group further comprises: positive overflow (+UN) and negative overflow (−UN).

17. The method of claim 13, wherein the group further comprises: positive infinity and negative infinity.

18. The method of claim 13, wherein the total order comparative relationship indicates that one of the two floating point operands having the positive zero format is greater than another of the two floating point operands having the negative zero format.

19. The method of claim 13, wherein the total order comparative relationship indicates that if the first floating point operand has the positive NaN format and the second floating point operand has the negative NaN format, and the first floating point operand contains the same value as the second floating point operand, ignoring the encoded status information in each, then the first floating point operand is greater than the second floating point operand.

20. The method of claim 13, wherein the total order comparative relationship indicates that if the first floating point operand has the NaN format and the second floating point operand has the NaN format, and the two floating point operands contain the same value in a fraction field, an exponent field, and a sign bit of the respective floating point operands, then the one of the two floating point operands containing a larger value in the encoded status information in each is greater than the other of the two floating point operands.

21. A method for comparing a first floating point operand and a second floating point operand according to a predefined total order comparative relationship, comprising:

receiving the first floating point operand and the second floating point operand;

determining a first floating point format of the first floating point operand from floating point status information encoded within the first floating point operand;

determining a second floating point format of the second floating point operand from floating point status information encoded within the second floating point operand; and generating a result indicating the total order comparative relationship between the first floating point operand and the second floating point operand based on the first floating point format and the second floating point format, wherein the first floating point format and the second floating point format are from a group comprising: not-a-number (NaN), infinity, normalized, denormalized, invalid operation, overflow, underflow, division by zero, positive zero, negative zero, exact, and inexact; and wherein the total order comparative relationship indicates that if the first floating point operand has the NaN format and the second floating point operand has the NaN format, then the one of the two floating point operands containing a larger value in a fraction field of the two floating point operands, ignoring the encoded status information in each, is greater than the other of the two floating point operands, regardless of a respective sign bit of each floating point operand.

22. A computer-readable medium on which is stored a set of instructions for comparing a first floating point operand and a second floating point operand according to a predefined total order comparative relationship, which when executed perform steps comprising:

receiving the first floating point operand and the second floating point operand related to a floating point instruction;

determining a first floating point format of the first floating point operand from floating point status information encoded within the first floating point operand;

determining a second floating point format of the second floating point operand from floating point status information encoded within the second floating point operand; and generating a result indicating the total order comparative relationship between the first floating point operand and the second floating point operand based on the first floating point format and the second floating point format, wherein the first floating point format and the second floating point format are from a group comprising: not-a-number (NaN), infinity, normalized, denormalized, invalid operation, overflow, underflow, division by zero, positive zero, negative zero, exact, and inexact; and wherein the total order comparative relationship represents on of a group comprising:

a relationship between the first floating point operand having the NaN format and the second floating point operand having the NaN format;

a relationship between the first floating point operand having the NaN format and the second floating point operand not having the NaN format; and a relationship between the first floating point operand not having the NaN format and the second floating point operand having the NaN format.

23. The computer-readable medium of claim 22, further comprising:

conditioning the outcome of a floating point instruction based upon the result generated.

24. The computer-readable medium of claim 22, wherein the total order comparative relationship indicates that one of the two floating point operands having the positive zero format is greater than the other of the two floating point operands having the negative zero format.

25. The computer-readable medium of claim 22, wherein the total order comparative relationship indicates that if the first floating point operand has the positive NaN format, and the second floating point operand has the negative NaN format, and the first floating point operand contains the same value as the second floating point operand, ignoring the encoded status information in each, then the first floating point operand is greater than the second floating point operand.

26. The computer-readable medium of claim 22, wherein the total order comparative relationship indicates that if the first floating point operand has the NaN format, and the second floating point operand has the NaN format, and the two floating point operands contain the same values in a fraction field, an exponent field, and a sign bit of the respective floating point operands, then the one of the two floating point operands containing a larger value in the encoded status information in each is greater than the other of the two floating point operands.

27. A computer-readable medium on which is stored a set of instructions for comparing a first floating point operand and a second floating point operand according to a predefined total order comparative relationship, which when executed perform steps comprising:

receiving the first floating point operand and the second floating point operand related to a floating point instruction determining a first floating point format of the first floating point operand from floating point status information encoded within the first floating point operand;

determining a second floating point format of the second floating point operand from floating point status information encoded within the second floating point operand; and generating a result indicating the total order comparative relationship between the first floating point operand and the second floating point operand based on the first floating point format and the second floating point format, wherein the first floating point format and the second floating point format are from a group comprising: not-a-number (NaN), infinity, normalized, denormalized, invalid operation, overflow, underflow, division by zero, positive zero, negative zero, exact, and inexact; and wherein the total order comparative relationship indicates that if the first floating point operand has the NaN format, and the second floating point operand has the NaN format, then the one of the two floating point operands containing a larger value in a fraction field of the two floating point operands, ignoring the encoded status information in each, is greater than the other of the two floating point operands, regardless of a respective sign bit of each floating point operand.

* * * * *

UNITED STATES PATENT AND TRADEMARK OFFICE
CERTIFICATE OF CORRECTION

PATENT NO.         : 7,133,890 B2
APPLICATION NO. : 10/028375
DATED              : November 7, 2006
INVENTOR(S)        : Guy L. Steele, Jr.

It is certified that error appears in the above-identified patent and that said Letters Patent is hereby corrected as shown below:

In claim 1, column 20, line 24, "zero exact," should read --zero, exact--.

In claim 22, column 23, line 60, "on" should read --one--.

In claim 27, column 24, line 39, "instruction" should read --instruction;--.

Signed and Sealed this

Ninth Day of January, 2007

JON W. DUDAS
*Director of the United States Patent and Trademark Office*